United States Patent [19]
Arai et al.

[11] 3,907,715
[45] Sept. 23, 1975

[54] PROCESS FOR PRODUCING METAL CONTAINING COMPOSITION

[75] Inventors: Tomio Arai, Zushi; Suguru Fukui, Tokyo; Tatsuo Morimoto; Hajime Kitazato, both of Yokohama; Tohru Yokoyama, Sagamihara, all of Japan

[73] Assignee: Chiyoda Kako Kensetsu Kabushiki Kaisha, Yokohama, Japan

[22] Filed: Feb. 23, 1973

[21] Appl. No.: 335,403

Related U.S. Application Data

[63] Continuation-in-part of Ser. No. 858,174, Sept. 15, 1969, abandoned.

[30] Foreign Application Priority Data

Sept. 14, 1968 Japan .................. 43-66501

[52] U.S. Cl. .............. 252/465; 252/463; 252/464; 252/466 PT; 252/466 J; 252/466 B; 423/600
[51] Int. Cl. ...................... B01j 11/16; B01j 11/22
[58] Field of Search...... 252/463, 464, 465, 466 PT, 252/466 J, 466 B; 423/600

[56] References Cited
UNITED STATES PATENTS

| | | | |
|---|---|---|---|
| 2,807,593 | 9/1957 | Dobres.............................. | 252/465 |
| 3,420,901 | 1/1969 | Schulz............................. | 252/463 X |
| 3,484,376 | 12/1969 | Paris et al...................... | 423/600 X |
| 3,651,159 | 3/1972 | Long et al...................... | 252/463 X |

Primary Examiner—Winston A. Douglas
Assistant Examiner—W. J. Shine
Attorney, Agent, or Firm—Kaufman & Kramer

[57] ABSTRACT

Solid dispersions of alumina and one or more metal or metal oxides, useful as catalysts and the preparation of ceramic materials, are provided.

These dispersions are prepared from complexes represented by the formula:

$$Al_n M_{n'} (OH)_m X_{3n+p-m}$$

wherein $n$ represents the number of aluminum atoms and falls within the range of 1 to 400; M represents one or more metals; $n'$ the total number of M atoms, said number falling within the range of 1 to 17; $m$ the number of OH groups, $m$ being in the range of 2 to 1000; X one or more monovalent anions other than OH groups; p the sum total of M valencies and $3n+p-m$ the total number of X anions; and wherein $n$, $n'$, $p$ and $m$ are such that $n$ is equal to or greater than 1, $n/n'$ is equal to or greater than 1 and $3n+p$ is greater than $m$.

9 Claims, No Drawings

PROCESS FOR PRODUCING METAL CONTAINING COMPOSITION

This application is a continuation-in-part of application Ser. No. 858,174, filed Sept. 15, 1969 now abandoned.

This invention relates to a method of producing a solid dispersed system (which is to be hereafter called "dispersed system") composed of alumina and metal or metal oxide. More particularly, it relates to a method of producing a dispersed system composed of alumina and at least one metal or metal oxide and uniformly dispersed in the alumina employing a new metal complex as the raw material.

How to disperse finely divided metal or metal oxides in an alumina carrier has been an important problem in the manufacture of catalysts and ceramic materials, and various studies and attempts have been made to improve the method in each field. See for example, Morikawa's articles in "The Kogyo Kagaku Zasshi," 70, 5, (1967) and in "The Shokubai Kagaku Koza," Vol. 5, p. 4.

Known methods for obtaining dispersions of the type described above, are briefly summarized as follows:

a. Impregnating powdered or molded active γ-alumina, obtained through the calcination of hydrated alumina, in at least one metallic salt solution, and then evaporating, drying and calcining the impregnated alumina, and optionally repeating these steps.

b. Precipitating hydrated alumina by adding a precipitant such as $NH_4OH$ to an aluminum salt solution, precipitating at least one metallic salt solution with a precipitant, mixing and stirring the precipitates uniformly, and then drying and calcining the mixture after washing it well.

c. Mixing an aluminum salt solution and at least one metallic salt solution co-precipitating them both by adding a precipitant such as $NH_4OH$, and filtering, washing, drying and calcining the co-precipitate.

d. Forming a hydrated alumina precipitate by adding a precipitant such as $NH_4OH$ to an aluminum salt solution, washing the precipitate, adding at least one metallic salt solution, evaporating the liquid, and then drying and calcining the impregnated alumina.

e. Mixing powdered alumina and a powdered metal constituent, molding the mixture in either a wet or dry state, and the calcining the molded material.

These methods, however, are not entirely satisfactory, from the techincal and economical points of view, in producing the desired uniform dispersions of metal or metal oxides in the alumina substrate. Thus, in method (a) the dilute salt solution becomes supersaturated as it is concentrated and dried, and covers the capillary tubes and porous surface of the carrier, and the solid precipitate collects around the openings of the capillary tubes as a result of drying and also the solution is drawn into the capillary tubes by the action of capillarity. When this material is calcined, the dispersed particles become coarse and are not uniformly dispersed throughout. When the resultant material is heated to a high temperature, it is likely to disintegrate. In method (b), where separate precipitates are prepared and mixed, it is extremely difficult to blend the materials sufficiently to obtain a uniform mixture. In method (c), involving neutralization of a mixed solution, it is very difficult to make the different ions precipitate at the same time and obtain a uniform co-precipitate, since different ions do not precipitate at the same rate under the same pH conditions. It is evident that metals and metal oxides cannot be homogeneously dispersed to a high degree in the alumina carrier either in method (d) involving dipping alumina into a separately prepared solution or in the method (e) involving mechanical mixing of separately prepared particulate materials.

Co-precipitation methods, which involve instantaneous mixing and precipitation, have also been proposed, but, the resultant materials are not microscopically uniform and these methods are difficult to employ in commercial operations.

Furthermore, as is well known, dipping co-precipitation and instantaneous precipitation methods produce very bulky gels and precipitates, more than 90% of which can be moisture. Solids concentration, in the case of hydrated alumina gel, for example, cannot be more than 10–20% at best, and these materials must be repeatedly washed, and even then, it is impossible to completely remove impurities which detract from the structural strength of the gel or precipitate.

In the present state of the art, when it is desired to prepare a carrier with two or more activating metals or metal oxides, dipping and impregnating methods are usually adopted. The carrier is first impregnated with a solution of the first constituent. The first constituent is fixed by drying and calcining, and then the carrier with the first constituent is impregnated with a solution of the second constituent, and dried and calcined. Thus, a lengthy and costly process is required to prepare a carrier bearing two or more constituents.

In view of this state of the art, it is an object of this invention to provide a new and industrially advantageous method which avoids the above-mentioned problems encountered in preparing systems composed of one or more finely divided metals or metal oxides uniformly dispersed throughout an alumina carrier.

In accordance with this invention it has now been discovered that the desired dispersions can be readily obtained by making use of a new complex, containing aluminum and at least one other metal with a higher standard reduction single electrode potential than aluminum as the raw material. By suitable treatment of this complex, such as by drying and calcining it, or by drying and calcining it after gelation with a gelling agent, or by drying and calcining it after treating with some base that gives decomposable salt at elevated temperature, or by drying and calcining it after forming gel or precipitate in the presence of normal base, the constituents are formed into a uniform dispersion as will be described below.

The above-mentioned new metal complex, which is used as the raw material, is represented by the following formula (I):

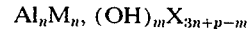

wherein $n$ represents the number of aluminum atoms and falls within the range of 1 to 400; M represents one or more metals; $n'$ the total number of M atoms, said number falling within the range of 1 to 17; $m$ the number of OH groups, $m$ being in the range of 2 to 1000; X one or more monovalent anions other than OH groups; p the sum total of M valencies and $3n+p-m$ the total number of X anions; and wherein $n$, $n'$, $p$ and $m$ are such that $n$ is equal to or greater than 1, $n/n'$ is equal to or greater than 1 and $3n+p$ is greater than $m$.

Metals represented by M having higher standard reduction single electrode potentials than aluminum are exemplified by:

Mn, Ti, Zr, Zn, Ac (Ac group), Cr, Mo, W, Ga, Fe, Cd, In, Tl, Co, Ni, Sn, V, Pb, Te, Sb, As, Bi, Cu, Hg, Ag, Ru, Rh, Pd, Os, Ir, Pt, Au, etc.

Monovalent anions represented by X are exemplified by $Cl^-$, $Br^-$, $I^-$, $NO_3^-$, $ClO_4^-$, $HCOO^-$, $RCOO^-$, etc., wherein R is an alkyl group, such as methyl, ethyl, propyl, etc.

These metal complexes represented by formula I can be produced by the reactions between (a) a salt of one of said metals and metallic aluminum or unaged aluminum hydroxide, (b), a mixed metal salt and aluminum salt solution and metallic aluminum or unaged aluminum hydroxide, and (c) a metal salt and an aluminum complex as described in more detail hereinafter. The new metal complex of this invention is generally obtained in a state of a homogeneous aqueous solution.

Examples of metal complexes represented by the above general formula are: $Al_5Cr(OH)_{15}Cl_3$, $Al_2Cr(OH)_6Cl_3$, $Al_3Cr(OH)_9(OOC \cdot CH_3)_3$, $Al_3Mn(OH)_9Cl_2$, $Al_3Zr(OH)_9Cl_4$, $Al_4Cr(OH)_{12}(NO_3)_3$, $Al_7Cr_2(OH)_{22}(NO_3)_5$, $Al_{10}CoMo(OH)_{30}Cl_7$, $Al_{12}NiCoMo(OH)_{36}(NO_3)_4Cl_5$, $Al_4Cr(OH)_{12}Cl_3$, $Al_4Ni_2(OH)_{13}(NO_3)_3$, $Al_4Fe_2(OH)_{15}(NO_3)_3$, $Al_5Mo(OH)_{15}Cl_5$, $Al_4Pt(OH)_{12}Cl_4$, $Al_2Sb(OH)_6Cl_3$, $AlMn(OH)_3Cl_2$, $Al_6Cr(OH)_{15}Cl_6$, $Al_{11}Cr(OH)_{30}Cl_6$, $Al_5Cr(OH)_{12}(NO_3)_6$, $Al_9Co(OH)_{24}(NO_3)_5$, $Al_{11}Mo(OH)_{30}Cl_8$, $Al_{20}CoMo(OH)_{54}Cl_{13}$, $Al_3Cr(OH)_6(OOC \cdot CH_3)_3Cl_3$, $Al_7Bi(OH)_{18}Cl_6$, $Al_3Mn(OH)_6Cl_5$, $Al_4Zr(OH)_9Cl_7$, $Al_{30}Mn(OH)_{75}Cl_{17}$, $Al_{12}Co(OH)_{30}Cl_2Br_6$, $Al_{16}CoMoNi(OH)_{44}(NO_3)_2Cl_{11}$, $Al_{50}Pt(OH)_{120}Cl_{34}$, $Al_{100}Pd(OH)_{240}Cl_{64}$, $Al_{23}Cr_2(OH)_{60}Cl_{15}$, $Al_5Cr(OH)_{12}Cl_6$, $Al_3Co_2(OH)_8(NO_3)_5$, $Al_5Co(OH)_{12}(NO_3)_5$, $Al_9Sn(OH)_{24}Cl_7$, $Al_4Cr(OH)_{10}Cl_5$, $Al_2Cr(OH)_5(NO_3)_4$, $Al_4Ni(OH)_{10}Cl_4$, $Al_4Fe(OH)_{10}(NO_3)_5$, $Al_{10}Mo(OH)_{25}Cl_{10}$, $Al_6Co(OH)_{15}(NO_3)_5$, $Al_{20}CoMo(OH)_{50}Cl_{17}$, $Al_{14}NiCoMo(OH)_{28}(NO_3)_{18}Cl_5$, $Al_{16}Mn(OH)_{40}Cl_{10}$, $Al_{200}Pt(OH)_{500}(NO_3)_{100}Cl_4$, $Al_2Sn(OH)_4(OOC \cdot CH_3)_2Cl_2$, $Al_{300}Pt(OH)_{750}(NO_3)_{150}Cl_4$, $Al_{400}Pd(OH)_{1000}Cl_{202}$, $Al_2Mn(OH)_5Cl_3$, $Al_8V(OH)_{18}(NO_3)_6Cl_3$, $Al_5Cr(OH)_{15}Cl_3$, $Al_{20}Ni_{17}(OH)_{50}(No_3)_{44}Al_{16}Ni_3(OH)_{40}(No_3)_{14}$, $Al_{40}Ni_3(OH)_{100}(NO_3)_{26}$, $Al_{12}CoMo(OH)_{30}Cl_{13}$, $Al_{100}Pt(OH)_{250}Cl_{54}$, $Al_8Co_2(OH)_{23}(NO_3)_5$, $Al_{30}Fe(OH)_{75}Cl_{18}$. To obtain a dispersed system containing one or more metals or metal oxides in a desired ratio to alumina, a metal complex containing the metal in a proper ratio to aluminum is prepared by any of the above methods, and it is treated by any of the hereinafter described gelling or precipitation methods.

When, for example, a dispersed system composed of 20 mol% of $Cr_2O_3$ and 80 mol% of $Al_2O_3$ is needed, an aqueous solution of any of the complexes represented by the formulae: $Al_4Cr(OH)_{12}Cl_3$, $Al_4Cr(OH)_{12}(NO_3)_3$, $Al_4Cr(OH)_9Cl_6$, $Al_4Cr(OH)_9(NO_3)_6$, $Al_4Cr(OH)_9Cl_3(NO_3)_3$, etc., may be used as the starting material. When a dispersed system composed of 33.3 mol% of NiO and 66.7 mol% of $Al_2O_3$ is desired, an aqueous solution of such complexes represented by the formulae: $Al_2Ni(OH)_5(NO_3)_3$, $Al_2Ni(OH)_5Cl_3$, $Al_2Ni(OH)_2(NO_3)_6$, $Al_2Ni(OH)_2Cl_6$, etc., may be used as the starting material.

The following methods may be employed to gel or precipitate the metal complex of formula I and form the desired uniform dispersion:

1. The solution of the metal complex can be dried to produce a resinous solid and then calcined. The temperature needed to evaporate the aqueous solvent is not critical, a temperature in the range of about 60°–120°C being generally suitable for this purpose. The temperature of calcination may vary with the metal and the intended use of the products.

Generally calcination is executed within the range of 120°–1400°C. When the product must contain active alumina, a temperature of 300°–900°C is particularly desirable.

2. A gelling agent can be added to the solution of the metal complex and the gelled material is dried and calcined after aging and, if needed, washing.

Commonly used gelling agents are suitable for this purpose; however, one that produces a precipitate immediately upon contact with the solution of metal complex is not desirable. Particularly desirable gelling agents are the weak bases with basic dissociation constants lower than $10^{-4}$, such as hexamethylenetetramine, urea, ethylenediamine, diethanolamine, triethanolamine, propylene oxide, etc. The rate of gelation is subject to such conditions as the concentration of metal complex, the concentration of the gelling agent, the temperature, etc. Generally, concentrations less than about 30% and preferably about 10–20% of metal oxides including the oxides of aluminum and all other metals, give satisfactory gelation results. The concentration of the gelling agent is optional. If a soft gel is desired, less is used, whereas if a hard gel is desired, more is used. Generally, it is useful to add approximately as much gelling agent as the amount of anion (except hydroxyl groups) present in the metal complex.

Gelation is generally effected at a temperature between room temperature and 100°C, but temperatures of 60°–90°C are particularly desirable. The higher the temperature, the shorter the time needed for gelation. For example, gelation requiring about 24 hours at room temperature, takes only 30 minutes at 80°C.

Anionic constituents contained in the metal complex and the gelling agent are generally removed, by decomposition and volatilization during the drying and calcining steps. However, washing of the gel prior to drying and calcining may be desirable when the calcining temperature is too low or the calcining time is too restricted by reason of the use of the finished dispersed system to remove anionic impurities and their existence is not desirable for the intended use. Drying and calcining conditions are similar to those described under method (1).

3. A base which converts the metal complex to a heat decomposable and volatile gel or precipitate, is added to the complex, and the gel or precipitate is dried and calcined under the same condition described under method (1). The base must be one which is capable of producing a salt. The salt readily decomposes and is volatilized during the drying and calcining of the gel. Examples of such bases are $NH_4OH$, $NH_4HCO_3$, $(NH_4)_2CO_3$, propylene oxide, hexamethylenetetramine, urea, ethylenediamine, diethanolamine, triethanolamine, etc. In addition, weak bases whose dissociation constant is lower than $10^{-4}$ are also of use. As much or more base is added as the amount of anion (other than hydroxyl groups) connected with the metal complex. The salts thus produced give excellent dispersed systems, since the anionic impurities volatilized are removed during the drying and calcining steps.

4. A conventional base is added to the solution of the metal complex, and the precipitate is dried and calcined under conditions described in method (1).

The base is a precipitant, is a strong base such as the hydroxides or carbonates of alkali or alkaline earth metals, etc. When the presence of alkali or alkaline earth metal added as a precipitant is undesirable as when the dispersed system is to be used as catalyst, the alkali or alkaline earth metal content may be removed by washing prior to drying and calcining the precipitate. The amount of base is to be added as a precipitant is approximately equal to the amount of anion (other than hydroxyl groups) contained in metal complex.

5. Two or more gels or precipitates obtained by any of the aforesaid methods are mixed and then dried and calcined in the manner described under method (1).

6. A mixture of two or more complexes or their solutions which contain the same metals, but in different proportions, is gelled or precipitated, dried and calcined in the manner described under methods 1–5.

7. A mixture of two or more different complexes or their solutions which contain different metals is gelled or precipitated using any of the aforesaid methods 1–5.

Dispersed systems produced by any of the above-mentioned methods may be obtained in the form of metal oxide - alumina dispersions, i.e., alumina dispersed with metal oxide, if calcination is carried out in an oxidizing atmosphere, or in the form of metal - alumina dispersions, i.e., alumina dispersed with reduced metal, if calcination is carried out in a reducing atmosphere. Also, a dispersed system in the form of a metal - alumina dispersion may be obtained from a metal oxide - alumina dispersion, if it is re-calcined in a reducing atmosphere.

When it is desirable because of the end use of the dispersion to have a dispersion which is entirely free of anionic impurities, it is preferred to use metal complexes prepared from salts of organic acids whose anions are readily decomposable and volatilized during the drying and calcining of the gelled or precipitated metal complex. The dispersed systems obtained by the aforesaid processes differ from each other in their specific gravity, surface area, pore diameter, pore distribution and pore volume, other properties and activities when used as catalysts. Therefore, it is possible to choose a process which can produce a dispersed system having properties and chemical activities desired in accordance with the use of the dispersed system. When producing, for example, the dispersed system $CoO-MoO_3-Al_2O_3$ containing 3.0 wt.% of CoO and 11.5 wt.% of $MoO_3$ from a metal complex having the composition $Al_{42}Mo_2(OH)_{105}Cl_{31}(NO_3)_2$, a system with larger surface area can be obtained by gelling or precipitating and drying and calcining according to methods (2)–(4), than by directly drying and calcining the aqueous solution of the said complex according to method (1). When producing the dispersed system $Ni-Al_2O_3$ containing 50 wt.% of Ni from a metal complex having a composition formula $Al_{20}Ni_{17}(OH)_{50}(NO_3)_{44}$, a dispersed system that has higher activity when used as a catalyst in the process of hydrogenation of benzene either in liquid or gaseous phase can be obtained by precipitating with common base and drying and calcining it according to method (4), than by drying and calcining the aqueous solution of said complex according to method (1).

Thus, this invention provides dispersions in which a metal or a metal oxide with a higher standard reduction single electrode potential than aluminum is uniformly dispersed in a desired ratio to alumina. Moreover, it is also possible to incorporate a metal or metal oxide with lower standard reduction single electrode potentials than aluminum, e.g., alkali metal and alkaline earth metal, etc., by treating the dispersed system by means conventional in the art, for example, by dipping the dispersion in a solution of salt of such metal, or by using any of the aforesaid processes, such as gelation or addition of common base. The dispersed condition and size of the dispersed particles in the dispersed system thus obtained, were examined through electron microphotographic, X-ray diffraction, X-ray microanalytic techniques, and compared with dispersed systems obtained by conventional methods. It was found that the dispersed system obtained by the method of this invention is superior to conventional materials with respect to uniformity, and state of sub-division. Electron microphotographs of 100,000–250,000 magnifications, showed that the particles were much finer and more uniformly dispersed in the dispersed systems of this invention than in those obtained by known procedures. When a dispersed system of this invention and conventional dispersions were calcined at 500°–600°C, and examined by X-ray diffraction, the former showed almost no diffraction line, while the latter showed 3 diffraction lines, though each line was broad in width. When the same dispersions were calcined at temperatures higher than 800°C, the dispersed system of this invention showed remarkably smaller diffraction intensity than the conventional dispersion. The fact that either very weak diffraction or no diffraction line is obtained or, shows that regularly shaped crystals are either not present or, though present, are of extremely small size, which indicates the existence of a substantially complete dispersed condition. When the dispersed systems of this invention and the prior art were examined by an X-ray analyzer with a resolving power of $1\mu$, the dispersed system of this invention showed a highly uniform dispersion of the constituent metal and alumina particles, while the conventional dispersion showed rather uneven distribution. The size of dispersed particles was smaller than $1\mu$, which is the limit of the analyzer's resolving power.

When the surface areas were compared by the amount of adsorbed nitrogen, the dispersed system of this invention was found to have remarkably larger surface area than the conventional one, and the pore distribution curve obtained from nitrogen adsorption and desorption studies showed a remarkably sharp size distribution, which indicates that the size of the particles is uniform.

The dispersed systems produced by the method of this invention are used as highly active catalysts for various catalytic reactions, the selection of the dispersed metals or their oxides being made to suit the desired catalytic reaction. When the dispersed systems are used as materials for ceramic applications, various products with different properties can be obtained by proper selection of metals and metal oxides in accordance with considerations known to those skilled in the art of ceramics manufacture.

One advantage of this invention lies in the fact that it makes available excellent dispersed systems from the aforesaid new metal complexes, while another advantage lies in the economics due to the simplification of the production process and the reductions in material requirements. When the metal complex obtained by the aforesaid method is used as raw material, the amount of anion consumed is much less than the usual case where an alumina carrier is produced from aluminum halide. Moreover, the amount of base needed for producing gel or precipitate from this metal complex is much less than is needed to gel or precipitate from this metal complex is much less than is needed to gel or precipitate the usual metal salt. Each of the individual methods has advantages which are specific to it alone, and these advantages should be considered in choosing a method of preparing a dispersed system for a given end use. Thus, method (1) is very advantageous from an industrial point of view, since it not only causes no loss of metals, metal oxides or alumina, but also because it is a remarkably simple way of preparing the dispersed system. Method (2) is advantageous since much less gelling agent is required than when a dispersed system is prepared from a salt solution by the conventional procedure. Method (3), on the other hand, involving treatment with a base which gives decomposable salt can be effected only with said metal complex, it generally being inapplicable to the usual salt. This method makes it simple to produce a dispersed system, by drying, calcining the gel or precipitate without washing and, thus, avoids loss of the materials due to washing. Moreover, the amount of base required for method (3) is approximately equal to the amount of anion (other than hydroxyl groups) contained in the metal complex, which is much less than that needed for producing a dispersed system of the same chemical composition from the usual salt solution. Method (4) produces a precipitate which can be more easily filtered and washed than the precipitate obtained from the usual salt solution. Besides, the basic particles of the precipitate are much more uniform in size, than those in dispersed systems obtained from usual salt solutions. The amount of base needed for this method is approximately equal to the amount of anion (other than hydroxyl groups) contained in the metal complex, which is, as mentioned above, much less than that needed in the case of the usual salt solutions.

As mentioned above, the method of this invention is a superior one from both technical and economical points of view. It solves various long standing problems in the production of dispersed systems composed of alumina and metals of their oxides.

The following examples are presented to more fully illustrate this invention.

EXAMPLE 1

Five hundred ninety grams of solid matter, obtained by drying 1500 g. of an aqueous solution (pH 3.0) of a metal complex having the composition $Al_5Cr(OH)_{15}Cl_3$ containing 8.63% of Al and 3.33% of Cr in an oven maintained at 120°C for five hours, was calcined at 500°C for two hours, and 320 g. of a dispersed system composed of chromium oxide and alumina was obtained. The dispersed system was composed of 22.8% of $Cr_2O_3$ and 77.2% of $Al_2O_3$ and had a surface area of 190 m$^2$/g. To compare the dispersed state of the resultant dispersed system, a dispersed system with the same composition as the above was prepared as a comparison sample by impregnating chromium trioxide on γ-alumina according to conventional dipping methods. The two dispersed systems were examined and compared by electron microphotography, X-ray diffraction and X-ray microanalysis. Electron microphotographs showed that the dispersed system of this invention was composed of uniform particles of about 25A and that chromium oxide and alumina were not distinguishable, while the conventional dispersion was composed of rather uneven particles of about 50A. The result of X-ray diffraction showed that the dispersed systems of this invention have an amorphous structure that indicates particles of minute size and slow crystal growth rate, while the conventional dispersion had three diffraction lines. When examined by an X-ray microanalyzer of 1.0μ resolving power, the dispersed system of this invention showed an extremely uniform dispersion of chromium and aluminum, while the conventional dispersion was a rather uneven dispersion. It was also found that the size of the dispersed particles of the two dispersed systems was smaller than 1.0μ which was the limit of the resolving power of the analyzer.

EXAMPLE 2

To 1500 g. of an aqueous solution of the same metal complex used in Example 1, 350 cc. of an aqueous solution containing 105 g. of hexamethylenetetramine was added as a gelling agent, and it was gelled at 80°C and further aged for 2 hours. After drying the gel for 10 hours an oven maintained at 120°C, 560 g. of blackish green solid matter was obtained. When it was calcined at 500°C for 2 hours, 319 g. of a dispersed system was obtained. It was composed of 22.4% $Cr_2O_3$ and 77.7% $Al_2O_3$ and a specific surface area of 220 m$^2$/g. To compare the dispersed state of the dispersed system, a dispersed system having the same composition as described above was prepared as in Example 1, by impregnating chromium trioxide into γ-alumina according to conventional dipping techniques. The two dispersed systems were examined and compared by electron microphotography, X-ray diffraction and X-ray microanalysis, and the results were the same as those of Example 1.

EXAMPLE 3

To 1,500 g. of an aqueous solution of the metal complex described in Example 1, 350 cc. of an aqueous solution containing 105 g. of hexamethylenetetramine was added as a gelling agent, and it was gelled at 80°C and aged for 2 hours. The gel was cracked at random, put into 1,500 cc. of a solution of 300 g/l of hexamethylenetetramine heated to 80°C, and then aged for 3 hours. It was washed 5 times with 5 liters each of distilled water, 3 times with 1 liter each of water in which 50 g. of ammonium nitrate and 2.5 cc. of concentrated ammonia water were diluted, and then twice with 2 liters each of distilled water. After washing, the gel was dried for ten hours in an oven maintained at 120°C, and 450 g. of dried matter was obtained. When it was further calcined at 500°C for two hours, 250 g. of a dispersed system composed of chromium oxide and alumina (23.0% $Cr_2O_3$ and 77.0% of $Al_2O_3$) having a surface area of 230 $m^2/g$ was obtained. To compare the dispersed state of the resultant dispersed system, a dispersed system having the same composition as described in Example 1, by impregnating chromium trioxide into γ-alumina according to conventional dipping techniques, was prepared. The two dispersed systems were examined and compared by electron microphotography, X-ray diffraction and X-ray microanalysis, with results being the same as indicated in Example 1.

When the dispersed systems obtained by Examples 1, 2 and 3 were used as catalysts in the dehydrogenation reaction of propane into propylene, each showed a rate constant 2 to 4 times as large as that of the one obtained by the conventional dipping method, which indicated that they have excellent catalytic activities.

EXAMPLE 4

One thousand grams of an aqueous solution of the metal complex $Al_{20}Ni_{17}(OH)_{50}(NO_3)_{44}$ containing 5.40% of Al and 9.98% of Ni was added, with vigorous stirring to 2200 cc. of a solution of 2 mol/1 caustic soda to produce a precipitate, which was then, after adjusting pH to 7.5, heated to 80°C and aged for an hour at the same temperature. The aged precipitate was filtered and washed six times with 2 liters each of distilled water. The resultant precipitate was dried at 105°C for 16 hours, giving 520 g. of the solid product. When one half of the dried product was taken and calcined for 3 hours in an electric oven maintained at 500°C, 115 g. of the dispersed system was obtained. It was composed of 55.2% of NiO and 44.8% of $Al_2O_3$.

Observation by electron microscope showed that the dispersed system was composed of uniform particles of about 25A; X-ray diffraction showed the existence of amorphous structure; and examination by an X-ray microanalyzer showed that both nickel and aluminum were dispersed in an extremely uniform state and that the size of the dispersed particles was smaller than $1.0\mu$, which was the limit of the resolving power of the analyzer.

This dispersed system was converted into another dispersed system in the form of $Ni-Al_2O_3$, by reducing it in the atmosphere of hydrogen at 450°C for 1.5 hours and used as a catalyst in the liquid phase and gaseous phase hydrogenation reaction of benzene. The catalyst showed far more superior reaction activities than various other dispersed systems of equal nickel content produced by conventional methods. The remaining half of the said dried product was filled into a quartz tube and reduced in an atmosphere of 60 cc/min. of hydrogen gas at 450°C for 1.5 hours. Hydrogen in the system was replaced with nitrogen gas flow, and the product was inactivated by passing nitrogen gas containing a very small amount of oxygen, 101 g. of a dispersed system composed of 49.4% of Ni and 50.6% of $Al_2O_3$ was obtained.

When the dispersed state of the resultant dispersed system was examined as noted above, under an electron microscope by X-ray diffraction and with an X-ray microanalyzer, the same results as described above were obtained. When used as a catalyst in liquid phase and gaseous phase hydrogenation reactions, it showed excellent reaction activity.

EXAMPLE 5

To 1000 g. of an aqueous solution of a metal complex having the composition $Al_{16}Ni_3(OH)_{40}(NO_3)_{14}$ containing 6.48% of Al and 2.64% of Ni, 245 cc. of an aqueous solution containing 73.5 g. of hexamethylenetetramine was added as a gelling agent and the mixture was gelled at 80°C and aged at the same temperature for about two hours. The resultant gel was dried in an oven maintained at 80°C for twelve hours, then at 120°C for ten hours, and about 400 g. of solid matter was obtained. It was calcined for 3 hours in an electric oven maintained at 800°C giving 157 g. of a dispersed system composed of 21.5% of NiO and 78.5% of $Al_2O_3$. Observation by electron microphotographs showed that the dispersed system was composed of uniform particles of about 100A. Examination by X-ray diffraction, showed a broad diffraction line of γ-alumina. Examination with an X-ray microanalyzer showed that both nickel and aluminum were dispersing in a very uniform state and that the size of the dispersed particles was smaller than $1.0\mu$, which was the limit of the resolving power of the analyzer.

EXAMPLE 6

One thousand grams of an aqueous solution of a metal complex having the composition $Al_{40}Ni_3(OH)_{100}(NO_3)_{26}$ containing 5.40% of Al and 0.88% of Ni, was dried in an oven maintained at 80°C for 12 hours, then at 120°C for 10 hours, giving 230 g. of solid matter which was calcined for 3 hours in an electric oven maintained at 900°C, 114 g. of a dispersed system composed of 9.8% of NiO and 90.2 of $Al_2O_3$ was obtained. Observation by electron microphotographs showed that the dispersed system was composed of uniform particles of about 100A. Examination by X-ray diffraction showed a rather broader diffraction line of γ-alumina, and an X-ray microanalyzer showed that both nickel and aluminum were dispersing in a very uniform state and that the size of those dispersed particles was smaller than $1.0\mu$ which was the limit of the resolving power of the analyzer.

EXAMPLE 7

One thousand three hundred fifty grams of an aqueous solution of a metal complex having the composition $Al_{20}CoMo(OH)_{54}Cl_{13}$ containing 1.09% of Co, 1.76% of Mo and 10.1% of Al, was dried for five hours in an oven maintained at 120°C, and 620 g. of pinkish-purple solid matter was obtained. When it was calcined for 3 hours at 550°C, 320 g. of a dispersed system containing 5.85% of CoO, 11.1% of $MoO_3$ and 80% of $Al_2O_3$ was obtained. When this dispersed system was examined by X-ray diffraction, it showed an amorphous structure. Examination by an X-ray microanalyzer disclosed that each metal was dispersed uniformly and that the size of the dispersed particles was smaller than $1.0\mu$, which was the limit of the resolving power of the analyzer.

EXAMPLE 8

To 1350 g. of an aqueous solution of the same metal complex as used in Example 7, 610 cc. of an aqueous solution containing 61 g. of ammonia ($NH_3$) was added as a gelling agent, and it was gelled at 70°C and further aged at the same temperature for 2 hours. The resultant gel was dried for 12 hours in an oven maintained at 80°C, then at 120°C for 10 hours giving 690 g. of a solid product which was calcined for 2 hours at 550°C, 330 g. of a dispersed system composed of 5.65% of CoO, 10.8% of $MoO_3$ and 78.5% of $Al_2O_3$ was obtained. Examination by X-ray diffraction and an X-ray microanalyzer of the dispersed condition and the size of dispersed particles, etc., of this dispersed system gave results similar to those of Example 7.

EXAMPLE 9

When 1000 g. of an aqueous solution of a metal complex having the composition of $Al_{20}CoMo(OH)_{54}Cl_{13}$ containing 1.09% of Co, 1.76% of Mo and 10.1% of Al, and 1000 g. of another aqueous solution of a metal complex having the composition $Al_{12}CoMo(OH)_{30}Cl_{13}$ containing 0.89% of Co, 1.45% of Mo and 8.32% of Al were mixed and dried for 5 hours in an oven maintained at 120°C, 940 g. of pinkish-purple solids was obtained. The solid product was calcined for 3 hours at 550°C giving 420 g. of a dispersed system containing 4.75% of Co, 7.6% of Mo and 82% of $Al_2O_3$. Examination by X-ray diffraction and an X-ray microanalyzer of the dispersed condition and the size of dispersed particles, etc., of this dispersed system gave results similar to those of Example 7.

EXAMPLE 10

To 2000 g. of a mixed aqueous solution of the same metal complexes as were used in Example 9, 740 cc. of an aqueous solution containing 170 g. of urea was added as a gelling agent, and the mixture was gelled at 90°C and further aged for 2 hours at the same temperature. When the resultant gel was dried for 10 hours in an oven maintained at 120°C, 1100 g. of solid product was obtained. When it was calcined for 3 hours at 500°C, 425 g. of a dispersed system containing 5.98% of CoO, 11.40% of $MoO_3$ and 82% of $Al_2O_3$ was obtained. Examination by X-ray diffraction and an X-ray microanalyzer of the dispersed condition and the size of dispersing particles of this dispersed system gave results similar to those of Example 7. When the dispersed systems obtained in Examples 7, 8, 9 and 10 were used as catalysts in the hydrodesulfurization reaction of a petroleum fraction, all of them showed marked desulfurization activities, which indicated excellent catalytic activities in those dispersed systems.

EXAMPLE 11

When 1500 g. of an aqueous solution of a metal complex having the composition $Al_{100}Pt(OH)_{250}Cl_{54}$ containing 9.72% of Al and 0.06% of Pt was dried for twenty-four hours in an oven maintained at 80°C, then at 120°C for seven hours, 510 g. of yellow solid product was obtained. When it was calcined for three hours at 580°C, 272 g. of a dispersed system containing 99.0% of $Al_2O_3$ and 0.37% of Pt was obtained.

To compare the dispersed condition of the resultant dispersed system, a dispersed system containing 0.35% of Pt was prepared by impregnating chloroplatinic acid into γ-alumina and the resultant product was examined by electron microphotographs, X-ray diffraction and an X-ray microanalyzer. From the electron microphotographs, platinum metal was not distinguished in both dispersed systems but the dispersed system obtained by the method of this invention showed a more amorphous structure than the one obtained by the impregnating method of the prior art. X-ray diffraction of the dispersed system obtained by the impregnating method showed four strong diffraction lines, while the one obtained by the method of this invention showed only three diffraction lines having half the strength of the former, which indicated the smaller crystal growth rate of the latter. Examination by X-ray microanalyzer disclosed that the dispersed system obtained by this method was a highly uniform dispersion of both platinum and aluminum, while the one obtained by the impregnating method was a rather uneven dispersion. The size of dispersing particles was smaller than $1\mu$, which was the limit of the X-ray microanalyzer.

EXAMPLE 12

To 1500 g. of an aqueous solution of the same metal complex used in Example 11, 330 cc. of an aqueous solution containing 92 g. of hexamethylenetetramine was added as a gelling agent, and the mixture was gelled at 80°C and further aged for 2 hours at the same temperature. When the resultant gel was dried for 24 hours in an oven maintained at 80°C, then at 120°C for 7 hours, 615 g. of yellow solid product was obtained. When it was calcined for 3 hours at 580°C, 277 g. of a dispersed system containing 98.0% of $Al_2O_3$ and 0.36% of Pt was obtained. To compare the dispersed condition of the resultant dispersed system, a dispersed system containing 0.35% of Pt was prepared as in Example 11, by impregnating chloroplatinic acid onto γ-alumina and both dispersions were examined by electron microphotographs, X-ray diffraction and X-ray microanalyzer with the same results as in Example 11.

EXAMPLE 13

To 1,500 g. of an aqueous solution of the metal complex used in Example 11, 330 cc. of an aqueous solution containing 80 g. of urea was added as a gelling agent, and it was gelled at 80°C. The resultant gel was crushed at random and put into 2 liters of an aqueous solution of 2 mol/l of urea and aged for a period of 2 and ½ hours at 80°C. It was washed seven times with 2 liters each of ammonia water of pH 8.0, and 5 liters each of distilled water. When the gel was dried for twenty hours in an oven maintained at 80°C, then at 120°C for seven hours, 390 g. of yellowish white solid product was obtained. When it was calcined for 3 hours at 580°C, 254 g. of a dispersed system containing 99.0% of $Al_2O_3$ and 0.35% of Pt was obtained. To compare the dispersed condition of the resultant dispersed system, a dispersed system containing 0.35% of Pt was prepared, as in Example 11, by impregnating chloroplatinic acid onto γ-alumina and examined by electron microphotographs, X-ray diffraction and X-ray microanalyzer wtih the same results as in Example 11.

EXAMPLE 14

To 1000 g. of an aqueous solution of a metal complex having the composition $Al_4Fe(OH)_{10}(NO_3)_5$ containing 5.4% of Al and 2.4% of Fe, 425 cc. of an aqueous solution containing 42.5 g. of ammonia ($NH_3$) was added as a gelling agent, and the mixture was gelled at 80°C and aged for 2 hours at the same temperature. When the resultant gel was dried for 12 hours in an oven maintained at 90°C, then at 120°C for 7 hours, 354 g. of solid product was obtained. It was calcined for two hours at 550°C giving 190°g. of a dispersed system composed of 42.0% of $Fe_2O_3$ and 53.6% of $Al_2O_3$. Examination by X-ray diffraction showed that this dispersed system has an amorphous structure; examina-

EXAMPLE 15

When 1200 g. of an aqueous solution of a metal complex having the composition $Al_2Mn(OH)_5Cl_3$ containing 4.5% of Al and 4.55% of Mn, was dried for 12 hours in an oven maintained at 95°C, 350 g. of solid product was obtained. It was calcined for 3 hours at 550°C giving 183 g. of a dispersed system containing 43.5% of $Mn_2O_3$ and 55.4% of $Al_2O_3$. Examination by X-ray diffraction showed that this dispersed system has an amorphous structure; examination by an X-ray microanalyzer indicated that each metal was dispersed in a uniform state and that the size of dispersed particles was smaller than $1.0\mu$, which was the limit of the analyzer.

EXAMPLE 16

When 470 g. of an aqueous solution of a metal complex having the composition $Al_3Zr(OH)_9Cl_4$ containing 1.75% of Al and 1.98% of Zr, was dried for twelve hours in an oven maintained at 95°C, 56 g. of solid product was obtained. It was calcined for 3 hours at 550°C giving 29 g. of a dispersed system containing 42.5% of $ZrO_2$ and 52.0% of $Al_2O_3$. Examination by X-ray diffraction showed that this dispersed system has an amorphous structure; examination by an X-ray microanalyzer indicated that each metal was dispersed in a uniform state and that the size of dispersed particles was smaller than $1.0\mu$, which was the limit of the analyzer.

EXAMPLE 17

To 500 g. of aqueous solution of a metal complex having the composition $Al_9Sn(OH)_{24}Cl_7$ containing 9.85% of Al and 4.80% of Sn, 220 cc. of an aqueous solution containing 110 g. of ammonium bicarbonate was added as a gelling agent, and the mixture was gelled at 60°C and further aged for 2 hours at the same temperature. The resultant gel was dried for twenty-four hours in an oven maintained at 80°C giving 200 g. of solid product. The solid product was calcined for 2 hours at 500°C giving 125 g. of a dispersed system composed of 24.0% of $SnO_2$ and 73.5% of $Al_2O_3$. Examination by X-ray diffraction showed that this dispersed system has an amorphous structure; examination by an X-ray microanalyzer indicated that each metal was dispersed in a uniform state and that the size of dispersed particles was smaller than $1.0\mu$, and that the size of dispersed particles was smaller than $1.0\mu$, which was the limit of the analyzer.

EXAMPLE 18

One thousand twenty grams of an aqueous solution of a metal complex having the composition $Al_8Co_2(OH)_{23}(NO_3)_3$, containing 5.3% of Al and 2.92% of Co, and 1,500 g. of an aqueous solution of a metal complex having the composition $Al_{11}Mo(OH)_{30}Cl_8$ containing 9.90% of Al and 3.19% of Mo, were mixed and stirred for about thirty minutes. The mixture was dried for five hours in an oven maintained at 120°C giving 960 g. of solid product which was calcined for 3 hours at 550°C yielding 500 g. of a dispersed system containing 7.6% of CoO, 14.4% of $MoO_3$ and 76.6% of $Al_2O_3$. Examination by X-ray diffraction showed that this dispersed system has an amorphous structure; examination by an X-ray microanalyzer indicated that each metal was dispersed in a uniform state and that the size of dispersed particles was smaller than $1.0\mu$, which was the limit of the analyzer.

EXAMPLE 19

One thousand three hundred grams of an aqueous solution of a metal complex having the composition $Al_4Ni(OH)_{10}Cl_4$ containing 4.44% of Al and 2.23% of Ni, and 760 g. of an aqueous solution of a metal complex having the composition $Al_{10}Mo(OH)_{25}Cl_{10}$ containing 7.16% of Al and 2.6% of Mo, were mixed and stirred for about 30 minutes. The mixture was added, while vigorously stirring, to 1,000 cc. of an aqueous solution containing 120 g. of caustic soda, as a precipitant, to produce precipitate which was aged for 2 hours at about 70°C. It was washed seven times with 2 liters each with dilute ammonia water of pH 8.0 and five times with distilled water. The resultant precipitate was dried for 12 hours in an oven maintained at 80°C, then at 120°C., for seven hours giving 480 g. of solid product which was calcined for 3 hours at 500°C. giving 280 g. of a dispersed system composed of 13.4% of NiO, 10.3% of $MoO_3$ and 74.5% of $Al_2O_3$. Examination by X-ray diffraction showed that this dispersed system has an amorphous structure; examination by an X-ray micronanalyzer indicated that each metal was dispersed in a uniform state and that the size of dispersed particles was smaller than $1.0\mu$, which was the limit of the analyzer.

EXAMPLE 20

When 1800 g. of an aqueous solution of a metal complex having the composition formula $Al_{30}Fe(OH)_{75}Cl_{18}$ containing 9.0% of Al and 0.62% of Fe, was dried for 12 hours in an oven maintained at 80°C., then at 105°C. for 5 hours, 550g. of brown solid product was obtained. This product was gradually heated from room temperature to 1,200 C. in 5 hours and then calcined for 2 hours at 1200°C. giving 322 g. of a dispersed system containing 4.97% of $Fe_2O_3$ and 95.0% of $Al_2O_3$. X-ray diffraction of this dispersed system showed some $\alpha$-$Al_2O_3$ and weak $\alpha$-$Fe_2O_3$ diffraction lines; examination by an X-ray microanalyzer indicated that each metal was dispersed in a uniform state that the size of dispersed particles was smaller than $1.0\mu$, which was the limit of the analyzer.

PREPARATION OF METAL COMPLEXES

The complexes used in this invention are produced by a reaction of at least one salt of said metals, and if desired, an aluminum salt with metallic alluminum or unaged aluminum hydroxide. The reaction is usually carried out in an aqueous solution, in which the total concentration of all the metallic salts, ranges from 0.1 mol/l to a saturated solution based on aluminum, with higher-than-minimum concentrations being preferred. The reaction can be executed in the range between room temperature and the boiling point of the reacting solution, with the range of 60° to 105°C being particularly preferred. The grain size of the metallic aluminum pieces to be added may range from powder to leaf, but particles under 10 mesh are generally preferred.

When the reaction is carried out with aluminum hydroxide instead of metallic aluminum, it is desirable to use unaged aluminum hydroxide gel immediately after production. Therefore, crystalline or aged aluminum hydroxide is not suitable.

With respect to the ratio of metallic alluminum or aluminum hydroxide to total metallic salts, 1 to 5 moles of aluminum is added to each mole of all the metallic salts.

The metal complexes of this invention can be produced by the reaction of metallic salts with an aluminum complex represented by the general formula $Al_n(OH)_m X_{3n-m}$ (wherein X represents a monovalent anion and $1 < n \leq 6$ and $3n > m$) these aluminum complexes may be prepared by method known in the art as taught, for example, in Australian Pat. No. 150140, British Pat. No. 873048 and Zeitschrift fur Anorganische and Allgemeine Chemie 301, 171-178 (1959). The reaction to produce the metal complexes of this invention is usually carried out in an aqueous solution wherein the concentrations of the complex ranges from 0.1 mol/l to a saturated solution with respect to the concentration of aluminum, though the higher concentrations are more desirable. The reaction can be conducted at a temperature within the range of room temperature to the boiling point of the reacting solution, but the boiling point itself is not desirable, in order to avoid the decomposition of the resultant complex. Therefore, the range of 60° to 105°C is generally suitable. The ratio of the metallic salt and the aluminum complex is determined in accordance with the number of metal atoms in the complex. Generally, more than 1 mole of aluminum is added for each 1 mole of metal. The amount of time required for the foregoing reactions usually ranges from 1 to 50 hours, though it may differ with the kinds of metallic salt and aluminum complex used as material, the particle size of the metallic aluminum, the concentration of solution, and reaction temperature, etc.

As the reaction progresses, added metallic aluminum or aluminum hydroxide gel dissolves gradually and the viscosity of the reacting solution increases. Thus, the metal complexes are usually obtained in a state of a homogeneous solution, and their ultraviolet absorption spectra are remarkably different from those of the metallic salts and aluminum complexes used as starting materials, which indicates that the reacted solution is not merely mixed solution of metallic salt and aluminum complex.

The reacted solution usually gels or precipitates with less base than the equivalent of anion contained in metallic salt or both of metallic salt and aluminum complex used as raw materials. This suggests the existence of a cation in the product of the reaction, which cation is equivalent to or less than the amount of the anion. The solid product obtained by drying the reacted solution readily forming a homogeneous solution when dissolved in water.

When the solid product obtained by drying the reacted solution was examined by X-ray diffraction, it showed a perfectly amorphous structure and no X-ray diffraction lines peculiar to the metallic salt, used as raw material, were found. The thermal characteristics of the product were examined by differential thermal analysis, and it gave a curve remarkably different from that of the metallic salt and the aluminum complex used as raw material. The metal complexes thus obtained are considered to be oligomers of comparatively high molecular weight having a structure in which the molecules are connected by bonds between the hydroxyl groups, like that of an aluminum aqua complex.

The following examples are presented to illustrate the method of preparing the above-described metal complexes.

EXAMPLE 21

The metal complex used as the starting material of Example 1 mentioned above was prepared by the following method.

To 799.2 g. (3 moles) of $CrCl_3 \cdot 6H_2O$ dissolved in 3.6 liters of water, was added, 405 g. (15 moles) of metallic aluminum grains of 10 to 100 mesh. The aluminum was dissolved, while heating and stirring at about 80°C. It took about 5 hours to dissolve the metallic aluminum completely. Hydrogen was produced vigorously and the solution assumed a blue color during reaction. The reaction yielded 4650 g. of an aqueous solution of the complex with pH 3.0.

The ultraviolet absorption spectrum of this solution showed maximum transmittance at 364 m$\mu$, as compared to a maximum transmittance at 324 m$\mu$ for a chromium chloride solution. As a result of elemental analysis, this complex was found to have the composition $Al_5Cr(OH)_{15}Cl_3$. Examination by X-ray diffraction, indicated an amorphous structure, while chromium chloride salt showed many peaks. Differential thermal analysis, showed a broad endothermic peak ranging from 150° to 400°C.

EXAMPLE 22

The metal complex used as the starting material of Example 4 was prepared by the following method.

450 g. of an aqueous solution of aluminum complex having the composition $Al_2(OH)_5NO_3$ and containing 12.00% (2 moles) of aluminum at pH 4.7, was reacted with 600 g. of an aqueous solution containing 495 g. (1.7 moles) of $Ni(NO_3)_2 \cdot 6H_2O$ by heating at 90°C with stirring for about 2 hours. This reaction produced 1,020 g. of an aqueous solution of the complex at pH 4.3.

As a result of elemental analysis, this complex was found to have the composition $Al_{20}Ni_{17}(OH)_{50}(NO_3)_{44}$. X-ray diffraction showed that it has an amorphous structure, as against the starting material.

EXAMPLE 23

The metal complex used as the starting material of Example 7 was prepared by the following method.

118 g. (0.5 mole) of $CoCl_2 \cdot 6H_2O$, 137 g. (0.5 mole) of $MoCl_5$ and 241 g. (1 mole) of $AlCl_3 \cdot 6H_2O$ were dissolved in 2 liters of water and heated at 80°C, 270 g. (10 moles) of metallic aluminum was added and dissolved in about 3 hours. As a result of this reaction, 2,700 g. of an aqueous solution of the complex at pH 3.4 was obtained.

The result of elemental analysis showed that this complex has the composition $Al_{20}CoMo(OH)_{54}Cl_{13}$. X-ray diffraction, showed an amorphous structure, instead of peaks as was seen with the starting material.

EXAMPLE 24

The metal complex used as the starting material of Example 15 was prepared by the following method.

To 570 g. of an aqueous solution of aluminum complex, having the composition $Al_2(OH)_5Cl$ and containing 9.54% (2 moles) of aluminum at pH 4.6, 700 g. of an aqueous solution containing 198 g. (1 mole) of $MnCl_2 \cdot 4H_2O$ was added. The mixture was heated at 80°C and stirred for about 2 hours. As a result of this reaction, about 1,200 g. of an aqueous solution of the complex at pH 3.0 was obtained.

As a result of elemental analysis, this complex was found to have the composition $Al_2Mn(OH)_{cl3}$. X-ray diffraction showed that it has an amorphous structure.

EXAMPLE 25

The metal complex used as the starting material of Example 16 was prepared by the following method.

233 g. (1 mole) of $ZrCl_4$ was dissolved in 0.5 liter of water, and heated with stirring at about 70°C. About 4,000 g. of gel, which was obtained by filtering and washing aluminum hydroxide gel obtained by the addition of 1.5 liters of 6N ammonia water to 3 liters of vigorously stirred aqueous solution containing 723 g. (3 moles) of $AlCl_3 \cdot 6H_2O$, was added and dissolved in about an hour. As a result of this reaction, 4600 g. of an aqueous solution of the complex at pH 2.1 was obtained.

As a result of elemental analysis, this complex was found to have the composition $Al_3Zr(OH)_9Cl_4$. X-ray diffraction showed that it has an amorphous structure.

What is claimed is:

1. A process for producing a dispersed system composed of alumina and one or more metals having higher single electrode potentials than that of aluminum or the oxides of such metals comprising the steps of drying and calcining an aqueous solution of one or more water soluble metal complexes containing aluminum and one or more metals having a higher standard reduction single electrode potential than that of aluminum and represented by the formula:

$$Al_n M_{n'} (OH)_m X_{3n+p-m}$$

wherein $n$ represents the number of aluminum atoms and falls within the range of 1 to 400; M represents one or more metals; $n'$ the total number of M atoms, said number falling within the range of 1 to 17; $m$ the number of OH groups, $m$ being in the range of 2 to 1000; X one or more monovalent anions other than OH groups; $p$ the sum total of M valencies and $3n+p-m$ the total number of X anions; and wherein $n$, $n'$, $p$ and $m$ are such that $n \geq 1$, $n/n' \geq 1$ and $3n+p > m$.

2. A process for producing a dispersed system composed of alumina and one or more metals having higher standard reduction single electrode potentials than that of aluminum or the oxides of such metals comprising the steps of gelling an aqueous solution of one or more metal complexes described in claim 1 by treatment of said complex at a temperature between room temperature and 100°C. with an effective amount of gelling agent said gelling agent being a weak base with a dissociation constant of less than $10^{-4}$, and then drying and calcining the resultant gel.

3. A process according to claim 1 in which M is selected from the group consisting of manganese, zirconium, chromium, molybdenum, iron, cobalt, nickel, tin and platinum and X is chloro or nitrate.

4. A process according to claim 2 in which M is selected from the group consisting of manganese, zirconium, chromium, molybdenum, iron, cobalt, nickel, tin and platinum and X is chloro or nitrate.

5. A process for producing a dispersed system composed of alumina and one or more metals having higher standard reduction single electrode potentials than that of aluminum or the oxides of such metals comprising the steps of gelling or precipitating an aqueous solution of one or more metal complexes described in claim 1 by treatment of said complex with an effective amount of a gelling or precipitating agent, said agent being a base which forms with said metal complex a decomposable salt, and then drying and calcining the resultant gel or precipitate.

6. A process according to claim 5 in which the gelling or precipitating agent is selected from the group consisting of ammonium hydroxide, ammonium bicarbonate, ammonium carbonate and a weak base with a dissociation constant of less than $10^{-4}$.

7. A process according to claim 5 in which M is selected from the group consisting of manganese, zirconium, chromium, molybdenum, iron, cobalt, nickel, tin, and platinum, and X is chloro or nitrate.

8. A process for producing a dispersed system composed of alumina and one or more metals having higher standard reduction single electrode potentials than that of aluminum or the oxides of such metals comprising the steps of precipitating an aqueous solution of one or more metal complexes described in claim 1 by treatment of said complex with a strong alkali or alkaline earth metal base, and then drying and calcining the resultant precipitate.

9. A process according to claim 8 in which M is selective from the group consisting of manganese, zirconium, chromium, molybdenum, iron, cobalt, nickel, zinc and platinum, and X is chloro or nitrate.

* * * * *

UNITED STATES PATENT OFFICE
CERTIFICATE OF CORRECTION

Patent No. 3,907,715  Dated September 23, 1975

Inventor(s) Tomino Arai et al.   Page 1 of 2

It is certified that error appears in the above-identified patent and that said Letters Patent are hereby corrected as shown below:

Column 1, line 21, change "70" to --$\underline{70}$--.

Column 1, line 50, change "and the" to read --and then--.

Column 2, line 59, in the formula (I) change "$Al_n M_n,$" to read --$Al_n M_{n'}$-- .

Column 3, line 10, after "$NO_3^-$" insert --$NO_2^-$--.

Column 3, line 23, change "$Al_5 CR$" to read --$Al_5 Cr$--.

Column 3, line 32, change "$cl_3$" to read --$Cl_3$--.

Column 3, lines 44, 45, change "$No_3$" to read --$NO_3$--.

Column 5, line 17, after "base" delete "is".

Column 5, line 63, after "$Mo_2$" insert --Co--.

Column 6, line 52, change "from" to read --form--.

Column 12, line 52, change "wtih" to read --with--.

Column 12, line 64, change "190°g." to read --190 g.--.

Column 13, line 27, change "$ZrO_2$" to read --$ZrO_2$--.

Column 13, line 51, after "1.0µ," delete the rest of that line up to and including "1.0µ," on line 52.

UNITED STATES PATENT OFFICE
CERTIFICATE OF CORRECTION

Patent No. 3,907,715     Dated September 23, 1975

Inventor(s) Tomio Arai et al.     Page 2 of 2

It is certified that error appears in the above-identified patent and that said Letters Patent are hereby corrected as shown below:

Column 14, line 40, change "1,200 C." to read --1,200°C.--.

Column 14, line 46, after "state" insert --and--.

Column 14, line 53, change "alluminum" to read --aluminum--.

Column 15, line 3, change "alluminum" to --aluminum--.

Column 15, lines 14 & 15, "Zeitschrift fur Anorganische and Allgemeine Chemie" should be underlined.

Column 16, line 1, "aqua" should read --aquo--.

Column 17, line 6, "$Al_2Mn(OH)_cl_3$" should read --$Al_2Mn(OH)_5Cl_3$--.

Column 17, Claim 1, the formula should read:

$$--Al_nM_{n'}(OH)_mX_{3n+p-m}--$$

Column 17, line 44, change "m" to read --$m$--.

Column 17, line 45, after "that", "n" should read --$n$--.

Signed and Sealed this

Seventh Day of September 1976

[SEAL]

Attest:

RUTH C. MASON
*Attesting Officer*

C. MARSHALL DANN
*Commissioner of Patents and Trademarks*